Figure 1:
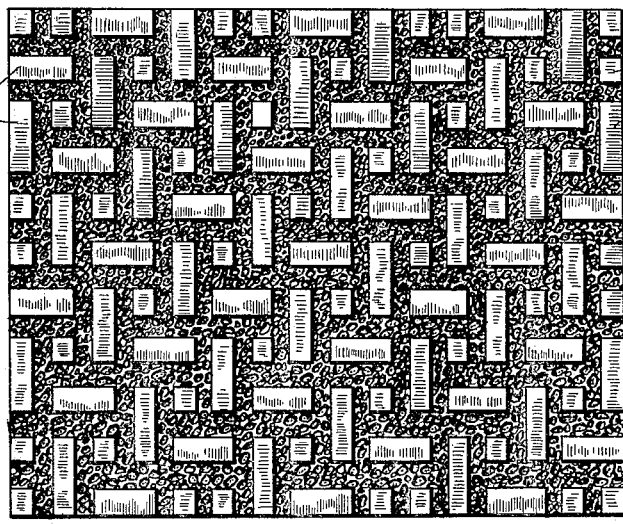

March 12, 1935.  H. T. COSS  1,994,096

ACOUSTICAL MATERIAL

Filed Aug. 18, 1931

INVENTOR
*Harold T. Coss.*
BY *D. N. Halstead*
ATTORNEY

UNITED STATES PATENT OFFICE 1,994,096

ACOUSTICAL MATERIAL

Harold T. Coss, Somerville, N. J., assignor to Johns-Manville Corporation, New York, N. Y., a corporation of New York Application August 18, 1931, Serial No. 557,851

13 Claims. (Cl. 72—17)

This invention relates to an acoustical material. More particularly, it relates to a decorative, washable, and permanent sound-absorbing article comprising patches of non-permeable material firmly adhering to the surface of a permeable sound-absorptive base, and the process of making the same.

Materials to be used for the absorption of sound should be permeable. This implies the presence in the sound-absorbing material of pores which are intercommunicating and which terminate in openings at the surface, to give a pitted appearance.

I have now discovered means of making an attractive tessellated surface of an acoustical article. Briefly, I have discovered that I may apply, over a substantial area of the face or surface of a permeable sound-absorbing base material, firmly adhering patches of ceramic glaze or other non-permeable material, without decreasing greatly the sound-absorption and with the production of a decorative, washable and permanent surface.

The following example illustrates one method of practicing my invention. Over the surface of a permeable base there is applied, in small areas or patches, a composition adapted to develop a ceramic glaze and a vitreous surface and to form a discontinuous surface that is suitably elevated with respect to the surface of the permeable base. The whole is then fired, to develop a ceramic bond and make a durable article with patches of firmly adhering glaze. As the permeable base, there is preferably employed a ceramic material with inter-communicating pores ending in openings at the surface.

In general the sound-absorptive base material employed is preferably rigid in structure and is permeable in all directions, that is the pores contained therein extend both laterally and vertically with respect to the face exposed to the sound to be absorbed and terminate in openings in the plane of the exposed face. The base material is preferably ceramic and the invention hereinafter is specifically described in connection with such a material. However, other types of permeable sound-absorptive material, particularly those of a rigid stone-like character which depend upon their permeable structure rather than inherent resiliency for their absorption effectiveness, may be substituted.

A permeable ceramic material which has been made with excellent results in accordance with my invention was produced according to the following procedure:—

A mixture is formed of a combination of plastic clay, a quick-setting cementitious material, as for instance, a hydraulic cement such as plaster of Paris, sawdust, and chemicals which react in the presence of water and acid to form carbon dioxide gas. This mixture is then added to water and acid, with rapid stirring, until uniformly wetted to a plastic slip condition, and is cast into molds coated with water-repellent material. The mass rises like dough within about 5 minutes from the time of wetting, and sets in about 10 minutes, so that the sides of the containing molds may be removed. The bloated mass is then handled on pallets into a dryer, dried, set in a kiln, and fired to the maturing temperature of the clay until a ceramic bond is produced. During the firing, the sawdust is decomposed with the production of gases which, in escaping, produce channels that provide intercommunication between the interior of the product and the face and other exterior surfaces thereof and also between the gas cells produced originally by the formation of the carbon dioxide gas. After cooling, the product may be sawed or ground to any shape desired. An example of the specific proportions which may be used follows.

| Dry materials — | Parts by weight |
|---|---|
| Flint fire clay | 600 |
| Plastic retort clay | 550 |
| Siliceous filler clay | 550 |
| Plaster of Paris | 250 |
| Whiting (through 60 mesh) | 80 |
| Alum (paper makers' aluminum sulfate) | 80 |
| Sawdust (through 20 mesh) | 400 |
| Wet materials— | |
| Water | 1700 |
| Sulfuric acid, concentrated | 23.4 |

In addition to the above product, permeable, ceramic material which may be employed as the base material in accordance with my invention may be produced by various other methods.

Figure 2:
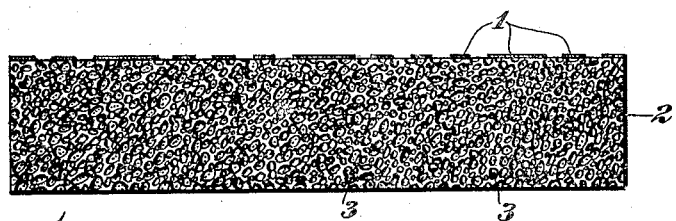
Figure 3:
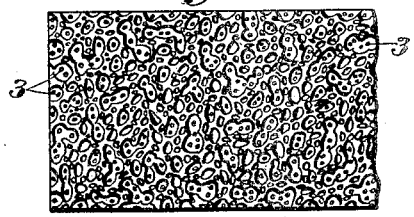

The invention is further illustrated by the drawings of Figs. 1, 2, and 3. Fig. 1 is a plan view of the product, Fig. 2 a corresponding side elevation, and Fig. 3 an enlarged side elevation of the base material.

In Figs. 1 and 2, there are evident the regularly shaped patches 1 over the surface of the permeable base material 2 and also the surface pits or pores in the permeable base. In many of these larger pores are dots 3 indicating small capillary channels or tubes which provide communication with other pores inwardly disposed.

Fig. 3 is an enlarged side view of the sound-absorption base showing not only that many of the large pores have perforations 3 (indicated by dots) providing inner communication but also that the pores sometimes communicate with laterally adjacent ones, as indicated by the union of some of the more or less circular lines bounding individual pores.

Since the capillaries or other means connecting the cells extend into the article both vertically and laterally to the surface exposed to the sound, these connections provide means whereby sound striking the permeable surface adjacent to an impermeable patch may penetrate the sound-absorbent material behind the patch.

An illustrative method of producing a typical, complete article is described in detail below.

Over a planed and well cleaned surface of a permeable ceramic base made, for example, as described above there is laid a stencil, suitably provided with a plurality of small open spaces adjacent to one another. Through the stencil openings, there is then painted or sprayed an engobe, compounded to firmly adhere to the porous base, on the one side, and to the glaze later to be applied, on the other. The engobe is smoothed and is then sprayed or painted over with a glaze composition. The stencil is removed and the glaze composition surface is dampened slightly with water, as with a sponge, brush, spray, or other suitable means, and pressed slightly, as with a dry cloth or felt roller, to flatten down any corners or edges which may have been lifted slightly in removing the stencil. The article is then dried and fired to vitrify the glaze and ceramically bond it and the engobe to the base.

By using this procedure, with stencils designed to give attractively patterned or regularly shaped small, discontinuous patches of the tile or glazed surface on the permeable base, there have been produced surfaces of attractive appearance. At a short distance the glazed tile patches with the intervening areas of base material give the appearance of a mosaic. At greater distances, with highly colored tile constituting the glazed patches, the surface appears almost as a solid glazed surface.

In the procedure outlined above, various engobes may be used, as for example, one of the following composition: Cornwall stone 43% by weight, feldspar 20%, china clay 13%, and ball clay 24%. The materials are ball-milled thoroughly for one hour, with sufficient water to give an over-all specific gravity of 1.33. The mixture is then screened through an 80-mesh screen, the material remaining on the screen not being used. The material passing through the screen is then applied over the stencil which is held tightly over the flat, planed and cleaned surface of the permeable base, the surface selected being that which is to be exposed to the incident sound waves during use of the finished product. The engobe is so applied as to fill holes and irregularities of the exposed parts of the permeable base and to make a firm, opaque, and smooth base, like a pottery body, to which the glaze is then applied. The glaze is then sprayed, dipped, or painted over the engobe while the stencil is still in place.

The glaze used may be any one of a number of types, of which the following two compositions are given for the purpose of illustration only. One of these glazes is adapted to give a glossy surface after firing; the other, a matte surface.

*Composition of glaze, parts by weight*

| Material | Glossy | Matte |
| --- | --- | --- |
| White lead | 40.0 | 40.0 |
| Feldspar | 10.0 | 18.6 |
| Flint | 11.0 | 13.6 |
| Zinc oxide | 4.0 | 3.8 |
| Tin oxide | 7.5 | 3.8 |
| China clay | 7.5 | 4.9 |
| Colemanite | 20.0 |  |
| Whiting |  | 15.3 |

In addition to these two opaque glazes, colors were obtained by introducing and grinding into the batch coloring oxides, as, for example, 2% of copper oxide on the weight of the formula for producing a glossy surface. In an oxidizing fire, this gave a brilliant green shade. With the matte formula there was incorporated, in one preparation, 0.18% cobalt oxide to produce a blue glaze after firing. It will be understood that the intensity of the color of the glaze varies with the thickness of glaze coat applied, as well as with the proportion of pigment added to the glaze composition. Also it will be understood that there may be incorporated other pigments or coloring materials used in the making of colored glazes or ceramic articles. For example, there has been used a complete set of Professor Charles F. Binns' matte colors and twenty principal majolica colors. These indicate the wide variety of shades which it is possible to produce in the glazed patches on a permeable base.

In a modification of the above process, there may be used a stencil of wax paper fitted tightly over the tile and held firmly against the surface, so that no engobe or glaze can seep under the edges of the stencil. Or, a paper stencil may be glued to the tile and, instead of being removed after the engobe and glaze are applied, burned off during firing.

After application of the engobe and glaze, the drying may be done at a usual rate. Or, the drying may be omitted as a separate operation and the tile fired immediately. With the formulas tabulated above, there has been used for firing, a clean oxidizing atmosphere, especially during the soaking period, and a maturing temperature of 1750 to 1900 degrees F., suitably 1800 degrees F. An exception was made with the colors of Professor Binns, in which case a maturing temperature of approximately 2000 degrees F. was used. Before firing, the tiles are suitably set on edge. After firing, the rate of cooling should be sufficiently slow to avoid crazing. A total time of cooling of 9 hours before opening the firing kiln has been used.

Since the glazed patches constitute an attractive feature of the appearance of the finished article, the pattern may be selected to leave the largest amount of exposed base material for sound-absorption with a minimum of conspicuousness of such base material. A pattern which is satisfactory for this purpose is a modified basket weave in which the patches are in the form of small squares or of rectangles, each of an area of the order of four-hundredths of a square inch, uniformly spaced over the surface and covering 52% of the total surface. While this pattern leaves exposed only 48% of the surface of the permeable base, it has been discovered that it does not decrease greatly the sound-absorption efficiency through that surface. The following data show the effect on the absorption of incident sound by typical specimens, as measured by the reverberation method, when the surface exposed to the sound is partly glazed in this manner, and, for comparison, the sound-absorption when such surface is not glazed and the permeable base is completely exposed.

| Character of surface exposed to sound | Percentage of sound absorbed | |
|---|---|---|
| | Frequency 250 to 500 cycles | Frequency 500 to 1,000 cycles |
| Surface with patches of glaze covering 52% of the total area | 39% | 57% |
| Surface with no patches | 43% | 60% |

The decrease in sound-absorption, in the two cases, is 4 and 3 units, respectively, or less than one-tenth or 10% in each case. It is evident, therefore, that the surface constituted of the patches and intervening areas of sound-permeable base material is adapted to admit a large proportion, say at least 75 per cent of the sound incident upon that surface.

Many variations from the details of the examples given for the purpose of illustration may be made without departing from the spirit of the invention. Thus the size of the individual patches or areas applied over the permeable base may be varied considerably, either to alter the appearance, for architectural purposes, or to change the properties, for absorbing sounds of different frequencies or pitches. Thus the area of the individual patch may be 0.01 to 0.04 square inches, 0.04 to 0.10 square inches, or 0.10 to 0.30 or 1 square inch, the exact size depending upon the effects which it is desired to produce and the character of the sound-absorptive base. I have used to advantage spaced, discontinuous patches of individual area equal to 0.04 square inch for producing a desirable appearance and permitting satisfactory absorption of sound of medium pitch.

The patches may be irregular in shape, such as produced by spraying a more or less lumpy paste discontinuously over a surface. However, the effect produced with regularly shaped patches of the glaze, such as squares, rectangles, stars or apparently woven patterns, is particularly pleasing.

Units of acoustical material made in accordance with this invention and having each different patterns or colors may be used in a structural assembly, as, for example, in a ceiling or wall, to give various pleasing effects.

The percentage of total area of the permeable base which may be covered with the non-permeable glaze or smooth surface may likewise be varied in accordance with the appearance desired, or the quality or percentage of the sound to be absorbed. In general the area covered in any particular instance is a compromise between these two factors. In most instances the covered area will constitute not less than 10% and not more than 85% of the exposed surface and a still more closely confined range of 25–70% or 40–60% e. g. 52% as specifically described above is desirable. Preferably, the size, shape, and arrangement of the covering patches are such that the sound-absorption through the surface having the patches upon it is decreased by not more than one-fourth or 25% and preferably less than 10% from what the absorption would be if the permeable surface were entirely uncovered.

The glazed tile or patches may be substituted by other firmly adhering materials, if the appearance, the permanence, or other property of the glazed tile is not desired. Thus, there may be applied to a surface of a permeable base, patches of non-permeable plaster, Portland cement, suitably mixed with some fine sand, a cold setting glaze, or other material adapted to become hard and firmly adhering on setting or firing. While some may prefer to have these patches of rough or uneven surface, I have found satisfactory the smoothing of the patches to an even surface that is elevated with respect to the surface of the permeable base. Patches such as those of plaster or cement may be colored by the inclusion of pigments or by painting or lacquering the surfaces.

If a different effect is desired, the engobe and/or glaze composition may be used in such quantity and in such manner as to coat more or less uniformly the high spots of the surface of the permeable base. For example, one face of a permeable ceramic base may be dipped, without the use of a stencil, in an engobe and then in a glaze composition and fired. In this process, the proportion of water to dry materials in the engobe and glaze compositions is suitably quite large, to give a relatively fluid mixture that will not bridge over or close a greater area of the surface openings of the pores in the permeable base than above indicated.

The terms "permeable" and "non-permeable" as used in the specifications and claims refer to the absorption of sound by the material. Thus a permeable material is one which is adapted to admit and absorb sound waves, whereas a non-permeable material is not so adapted. Permeability is indicated also by the ready passage of air, under slight pressure, through the material. Materials of wide range of quality or sound-absorption or permeability may be used as the base. Thus, there may be used bases which, in one-inch thickness, absorb 15 to 80% or more, suitably 40 to 60% of sound of 512 cycles frequency. When the base with its applied patches of smooth material is not to be fired, a permeable block of non-refractory material, as, for example, plaster, may be used as the base.

In place of applying a glazable material to the ceramic base material, the base material may be fired in such a manner as to partially glaze the surface e. g., by firing in the presence of volatile fluxes such as sodium chloride, and firing so that the surface is not entirely glazed but vitrified only in scattered patches, thereby providing alternating patches of permeable and non-permeable surface, or so that the surface is glazed substantially completely over the high spots, to leave open a number of pores communicating with inner pores. Suitably at least half the total area of surface pores are left in approximately the same state of communication with the interior as before the glazing. In one process of making such a glaze, salt may be introduced in limited quantity into the fire-box of the kiln in which the permeable base is being fired.

A modification of the invention that may lower the cost of production or increase the utility of the product for certain uses is the following:

A permeable ceramic base is deeply notched, grooved, or channeled, to leave projecting plateaus of size, shape, and pattern desired. The thus treated face is dipped into the engobe and then into the glaze composition in such manner that only the high spots or plateaus are coated, the channels or low areas being left uncoated. The product is then fired to vitrify the patches of glaze and ceramically bond them to the permeable base.

The terms "permeable" and "non-permeable", as used herein, refer to the permeability or non-permeability to air-borne sound.

The details that have been given are for the purpose of illustration, not restriction, and variations within the spirit of the invention are intended to be included in the scope of the claims.

What I claim is:

1. A sound absorbing article comprising a sound-absorptive base material having cellular spaces that communicate in directions lateral and vertical to the surface exposed to the sound to be absorbed and patches of impermeable material firmly adhering to the said surface.

2. A sound-absorbing article comprising a sound-absorptive rigid base material having cellular spaces that communicate in directions lateral and vertical to the surface exposed to the sound to be absorbed and patches of impermeable material firmly adhering to the said surface.

3. An acoustical tile comprising a base of porous, rigid, sound-absorbing material permeable in all directions, the surface of the base exposed to the impingement of sound being composed of alternating areas of non-permeable and permeable material, the non-permeable area constituting not less than 10% and not more than 85% of the total exposed area.

4. An acoustical tile comprising a base of porous, rigid, sound-absorbing ceramic material permeable in all directions, the surface of the base exposed to the impingement of sound being composed of alternating areas of non-permeable and permeable material, the non-permeable area constituting not less than 10% and not more than 85% of the total exposed area and being substantially uniformly spaced thereover.

5. A sound-absorbing article comprising a sound absorptive base ceramic material having cellular spaces that communicate in directions lateral and vertical to the surface exposed to the sound to be absorbed and patches of impermeable ceramic material firmly adhering to the said surface.

6. A sound-absorbing article comprising a permeable ceramic base provided with intercommunicating pores adapted to absorb incident sound and communicating with the face of the article and firmly adhering non-permeable patches of ceramic material covering approximately half of the face of said base exposed to the sound to be absorbed.

7. A sound-absorbing article comprising a permeable ceramic base provided with intercommunicating pores adapted to absorb incident sound and communicating with the face of the article and firmly adhering non-permeable patches of ceramic material covering less than 70 per cent of the face of said base exposed to the sound to be absorbed.

8. A sound-absorbing article comprising a permeable ceramic base provided with intercommunicating pores adapted to absorb incident sound and communicating with the face of the article and firmly adhering non-permeable patches of ceramic material covering a substantial part of the surface of the base exposed to the sound to be absorbed, the said patches having individually an area of the order of four-hundredths of one square inch.

9. A sound-absorbing article comprising a permeable ceramic base provided with intercommunicating pores adapted to absorb incident sound and communicating with the face of the article and firmly adhering non-permeable patches of ceramic material, said patches having individually an area of approximately four-hundredths to one-tenth of one square inch and collectively an area equal to approximately half of the surface over which they are applied.

10. A decorative acoustical material comprising a permeable base provided with intercommunicating pores adapted to absorb incident sound and communicating with the face of the article and regularly shaped patches of smooth outer surface firmly adhered to the base, said patches forming a discontinuous surface that is elevated with respect to the surface of the base porous article.

11. A decorative acoustical material comprising a permeable base provided with intercommunicating pores adapted to absorb incident sound and communicating with the face of the article and regularly shaped patches of smooth outer surface, applied to one face of the base, said patches forming a discontinuous surface that is elevated with respect to the surface of the permeable base and covering approximately half of the surface to which they are applied.

12. A sound-absorbing article comprising a ceramic base provided with pores communicating with each other and with an outer surface of the article and firmly adhering non-permeable patches of ceramic material covering substantially less than all of the face of the said base exposed to the sound to be absorbed, the said patches defining therebetween exposed areas of sound-permeable material and being elevated above the said areas.

13. A sound-absorbing article comprising a base including a fired clay binder provided with pores communicating with each other and with the surface of the article and non-permeable patches of ceramic material disposed over and integrally united to a surface of the article.

HAROLD T. COSS.